United States Patent [19]

Obermeier

[11] Patent Number: 4,822,447
[45] Date of Patent: Apr. 18, 1989

[54] HIGH-FREQUENCY WELDING INSTALLATION

[76] Inventor: Hans Obermeier, Breslauer Str. 43, D-8228 Freilassing, Fed. Rep. of Germany

[21] Appl. No.: 72,270

[22] PCT Filed: Oct. 27, 1986

[86] PCT No.: PCT/DE86/00432
   § 371 Date: Aug. 3, 1987
   § 102(e) Date: Aug. 3, 1987

[87] PCT Pub. No.: WO87/02607
   PCT Pub. Date: May 7, 1987

[30] Foreign Application Priority Data

Oct. 26, 1985 [DE] Fed. Rep. of Germany ....... 3538149

[51] Int. Cl.[4] .................. B30B 15/30; B65G 37/00
[52] U.S. Cl. .................... 156/538; 100/221; 100/222; 156/380.6; 156/556; 156/566; 156/583.1; 198/579; 198/580; 198/583; 198/607
[58] Field of Search ............... 156/538, 556, 557, 566, 156/380.6, 583.1; 100/207, 221, 222, 224; 198/159, 580, 583, 607, 797, 799

[56] References Cited

U.S. PATENT DOCUMENTS

| | | | |
|---|---|---|---|
| Re. 30,759 | 10/1981 | Burkner | 156/583.1 |
| 1,123,934 | 1/1915 | Schrafft et al. | 198/607 |
| 1,511,256 | 10/1924 | Bausman | 198/580 |
| 1,837,605 | 12/1931 | Baker | 198/580 |
| 1,854,351 | 4/1932 | Suppes | 198/583 |
| 2,027,165 | 1/1936 | Grubman | 18/4 |
| 4,113,082 | 9/1978 | Timin | 198/580 |

FOREIGN PATENT DOCUMENTS

| | | |
|---|---|---|
| 1295319 | 5/1969 | Fed. Rep. of Germany . |
| 1756438 | 4/1970 | Fed. Rep. of Germany . |
| 1704326 | 5/1971 | Fed. Rep. of Germany . |
| 2518689 | 11/1976 | Fed. Rep. of Germany . |
| 2752654 | 6/1978 | Fed. Rep. of Germany . |
| 2071993 | 12/1970 | France . |
| 2486040 | 1/1982 | France . |
| 50-145985 | 11/1975 | Japan . |
| 884219 | 6/1960 | United Kingdom . |

OTHER PUBLICATIONS

Article by G. F. Abele, "Hochfrequenz-Schweisstechnik"0 second, newly revised and expanded edition, 1973, Zechner & Hüthig Verlag GmbH, Speyer am Rhein (F. R. Germany).

Primary Examiner—Michael Wityshyn
Attorney, Agent, or Firm—Toren, McGeady & Associates

[57] ABSTRACT

A high-frequency welding installation for welding particularly plastic material parts includes at least two work stations and one feed station arranged in linear succession and trays on which work pieces are conducted through the stations by means of a transport system in a single direction and are returned into the initial station in the opposite direction outside of the stations in an essentially vertically offset plane, wherein the trays are arranged during the transport in both directions always with the working side facing upwardly. Four essentially straight-line transport units are provided. The first unit is a feed unit, the third unit is a return unit, and the second and fourth units are each vertical elevators. The return unit is arranged essentially parallel to the work unit and at least the return unit operates at a higher transport speed than the feed unit.

4 Claims, 1 Drawing Sheet

U.S. Patent  Apr. 18, 1989  4,822,447
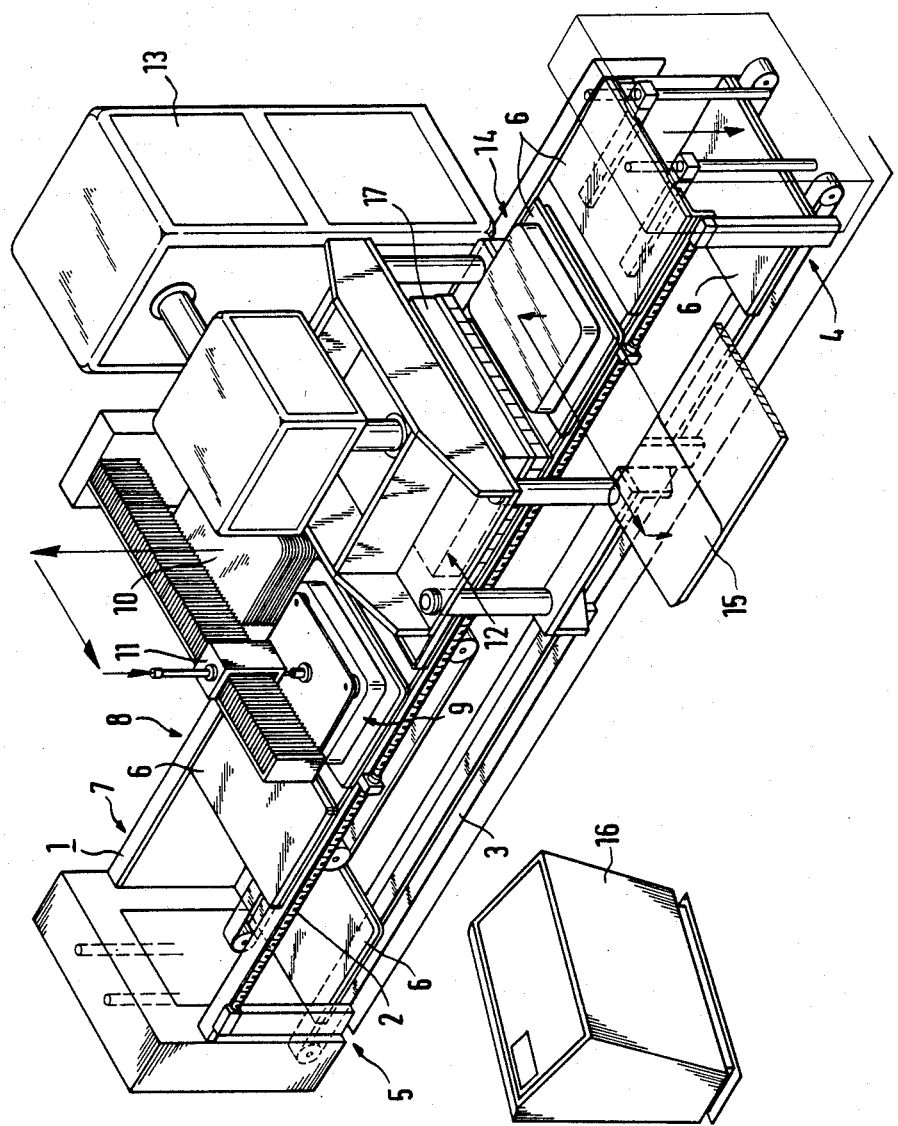

HIGH-FREQUENCY WELDING INSTALLATION

BACKGROUND

1. Field of the Invention

The invention relates to a high frequency welding installation for welding particularly plastics material parts, as used, for example, for manufacturing bathtub liners or motor vehicle mats.

2. Description of the Invention

Different types of high frequency welding installations are already known. For example, installations with a sliding table composed predominantly of a work station and one or two feed stations are available on the market. These installations include so-called trays which, provided with the workpiece or with component parts of the workpiece, are pushed from the respective feed station into the work station. After the welding procedure has been carried out, the tray is again pushed from the work station into one of the feed stations. Simultaneously, an already loaded tray can be pushed from the second feed station into the work station. Thus, in the known installation, conveying takes place, for example, from the first feed station into the work station and again back into the first feed station, without a continuous conveying in a single conveying direction being possible. Depending upon the number of feed stations, this known installation requires for its operation at least two or four operators, with only one work station being provided in each case. Accordingly, this known installation is labor intensive. In addition, this installation is usually not expandable in a modular manner as desired, so that it is not possible to have the first and single work step, namely the welding step, be followed by other work steps. For example, if two feed stations are present in one work station, two working places must be provided including the necessary accessories, for example, deposits for finished and unfinished material. This again requires a relatively large amount of space.

In addition, high frequency welding installations in the form of round tables or revolving tables are known. These installations consist essentially of a round table or a revolving table which has at its periphery several receptacles for the workpieces, wherein the number of receptacles corresponds to the number of the provided work or operating stations. Such a revolving table usually has four tables or workpiece receptacles which rotate jointly about an axis. The width required for this installation is very large since it requires at least the width of three tables. The operation of the tables or the feeding of the workpiece receptacles is possible only from one of the long sides of the respective tables. In addition, it is not possible to deposit material in a manner conforming to the working steps and an operation by means of manipulating devices (robots) is not provided. Moreover, the known revolving table arrangement cannot be expanded indefinitely because the number of stations is already fixed from the conception of the arrangement. Additional work stations cannot subsequently be inserted. Also, these rounded tables always have the same cycle times. Thus, depending upon the cycle time, always only a relatively short cooling time is available, so that a sufficient cooling time cannot be provided, for example, when welding with closed cover tools is performed. Only the entire cycle time can be adjusted to the length of the cooling time. This, in turn, reduces the efficiency of the arrangement. In these known revolving table arrangements, the transport speed can be increased only to a limited extent because of the existing centrifugal forces. This is because if the transport speeds are increased, the parts to be welded together, which are exactly placed relative to each other in the feed station, are cast from their positions.

Finally, high-frequency welding installations are known in which a continuous, linear conveyance of the workpieces to be welded is possible through the successively arranged stations. These installations are either equipped with transport chains which have at their top side drive means for the plastic sheets to be welded, as described in German Offenlegungsschrift No. 33 12 418, or they have receiving trays for the parts to be welded together, wherein the receiving trays are fixedly fastened to the transport system. The finished workpiece must be removed from the transport system at the end of the work portion or feed portion thereof, because the workpieces would fall or tilt from the transport receptacles or trays during transition to the next transport system portions (vertical or parallel portions located underneath). Accordingly, it is not possible to return the trays with the welded parts thereon to the initial station. In addition, at least twice the number of trays must be provided than the corresponding number of stations because at least as many unloaded trays as loaded trays are in circulation. In these known installations, a fixed cycle time is also used in all portions of the transport device. Thus, it is not possible to have the trays returned more quickly or to have the trays stay for a longer time in a cooling station.

It is the object of the invention to provide a high-frequency installation which is relatively simple and additionally very flexible in its structure and very economical.

SUMMARY OF THE INVENTION

In accordance with the present invention, a high-frequency installation for welding particularly pastic material parts includes at least one work station and one feed station arranged in linear succession, and trays on which the workpieces are conducted through the stations by means of a transport system in a single direction and are returned into the initial station in the opposite direction outside of the stations in an essentially vertically offset plane, wherein the trays are arranged during the transport in both directions always with the working side facing upwardly. In accordance with the invention, at least two work-stations arranged in linear succession and four essentially straight-line transport units are provided. The first unit is a feed unit, the third unit is a return unit, and the second and fourth units are each constructed in the manner of a vertical elevator. The return unit is arranged essentially parallel to the work unit. At least the return unit has a higher transport speed than the feed unit.

Accordingly, the installation according to the invention has, in addition to a feed station, at least two work stations which are arranged in line one behind the other. The transport system connecting the work stations with each other is constructed in such a way that the trays on which the individual workpieces are moved through the individual stations are conveyed in a single direction through all stations and are returned into the initial station in the opposite transport direction outside of the work stations. The trays are arranged on the transport device or on the transport system in both transport directions, i.e., in feed direction and in return direction, always with the working or feeding side facing upwardly. This provides the substantial advantage that very little space is required due to the linear arrangement of the individual stations one behind the other. For example, at most half the space is required as it is required for revolving tables. In addition, it is possible to feed from two sides, and to feed manually or by machine through unilateral manipulating devices or gate robots. Thus, it is possible to arrange the material necessary for feeding on both sides of the installation so as to be ready for manipulation, so that no substantial problems exist with respect to space when several individual parts are to be welded together. Due to the linear arrangement of the stations, the transport of the workpieces can be accelerated as desired, without having to be afraid of the influence of centrifugal forces, as is the case in revolving tables.

Since, in accordance with the invention, the trays are always conducted through the transport system with the top side, i.e., the working or feeding side, facing upwardly, even when they are being returned into the initial position, it is possible to leave the finished welded workpieces on the trays even when the trays are returned. The workpieces are only removed from the trays when in the initial station located in front of the feed station. This results in the substantial advantage that immediately after the last work station, for example, the welding station if no subsequent welding step is provided, the finished workpiece with closed cover tool requiring a longer cooling time can remain on the transport tray. Sufficient time for the appropriate cooling of the workpiece remains during the return transport into the initial position. This shortens the entire length of the installation because it is not necessary to provide a cooling section which would extend the work portion of the transport system or an additional receiving unit for the parts to be cooled.

In accordance with a further development of the invention, the transport system is formed by a single transport unit which guides the trays continuously, i.e., with constant velocity, along their entire travel, wherein the return portion is arranged essentially parallel to the feed and work portion. The transport unit forming the transport system can be entirely arranged on a horizontal plane.

An advantageous embodiment of the invention results from arranging the return portion of the transport system in a plane which extends vertically relative to the work portion. The relative vertical arrangement of return and work portions saves a substantial amount of space. The transport system may be a conveyor type elevator in which the transport unit has always the same vertical alignment.

In accordance with the another further development of the invention, the transport system of the installation is advantageously composed of at least two transport units which are independent from each other. A particularly advantageous installation is obtained if the transport system is composed of four essentially straight-line transport devices, wherein always two of the four transport units are aligned parallel relative to each other. The first unit may be a feed or work transport unit and the third unit, extending parallel to the first unit, may be a return transport unit. The second and fourth units, in turn, may be connecting transport units.

In the embodiment in which the feed and return units are arranged vertically one above the other, it is an advantage if the connecting units are constructed in the manner of a vertical elevator. The trays which arrive, for example, at the end of the feed unit, are picked up by the elevator and placed on the return unit located underneath. The trays moved from the return unit to the next elevator unit are moved again vertically upwardly by the latter into the initial station, where the trays are unloaded in order to be subsequently conveyed through the feed unit into the feed station and then through all work stations.

The return unit can of course be arranged vertically above or vertically underneath the feed unit. However, it is apparent that the arrangement of the return portion underneath the return unit is the more advantageous embodiment because an arrangement above the working level would lead to difficulties in the feed stations as well as in the work stations. The arrangement underneath the working level is to be considered the optimum arrangement because the returning transport takes place underneath the work tables of the stations and this space is predominantly not otherwise utilized.

The division of the transport system into four parts provides the significant advantage that the individual transport units can be operated independently from each other with different transport speeds. Thus, at least the return unit can be operated at a higher speed than the feed unit. Thus, a tray which has been removed by the vertical elevator from the feed unit can be placed relatively quickly onto the return belt located underneath and can be transported very quickly to the opposite elevator and to the initial station.

The above-described advantage can be obtained because the individual trays are not rigidly connected to the transport system, but are individually picked up by the four individual transport units and are individually guided and transported. Accordingly, a fixed spacing between the trays, which would require a constant speed, does not exist. In addition, the substantially faster return transport results in a significant savings because trays are no longer fastened on the entire length of the transport system with constant spacing between trays. Thus, a relatively large number of trays are saved without negatively influencing the work rhythm.

The linear arrangement of the stations according to the invention, as well as the individual arrangement of the trays on the individual transport units of the transport system of the installation, permit a modular construction of the entire installation. The installation can be set up in such a way that, when the installation is to be changed over to manufacturing a different workpiece which requires more work steps and, thus, more stations, similarly equipped stations can be relatively easily included and interlinked in the installation. Accordingly, it is possible either immediately at the beginning of setting up the installation to select and interlink the individual modules for the necessary stations, or to change the installation later requiring little modification. Due to this modular construction, it is possible to use for the manipulation of such workpieces either manipulating devices specifically developed for this purpose or manipulating devices which are generally commercially available.

It is apparent from the above that the high-frequency welding installation according to the invention has a flexibility which in the past could not be reached by other welding installation.

In the following, the invention shall be described in more detail with reference to an embodiment illustrated in the drawing.

BRIEF DESCRIPTION OF THE DRAWING

In the drawing:

The single FIGURE of the drawing is a perspective view of the high-frequency welding installation according to the present invention.

DETAILED DESCRIPTION OF THE INVENTION

In the embodiment of the high-frequency welding installation according to the invention illustrated in the drawing, the return unit is located vertically underneath the feed unit. In addition, a transport system composed of four parts is provided.

The installation is essentially placed on a base frame (1) and includes an upper transport unit, i.e., feed unit (2), and, located vertically therebelow, a lower transport unit, i.e., return unit (3). At the two ends of the feed unit and the return unit are arranged elevator units (4) and (5) which connect the feed unit and the return unit.

The transport system further includes trays (6) which are transported by the four transport units always in the same direction. A tray (6) each is assigned along the feed unit of the installation to each station. Thus, the illustrated installation includes an initial station (7) which simultaneously may be the upper position of the elevator unit (5). The next station (8) seen in transport direction can in turn be considered the initial station or the loading station, depending on whether finished workpieces are removed from tray (6) in this station, or whether starting material for the finished workpiece is already manually placed on the tray.

The next station is the actual feed or loading station (9). A stack (10) of workpieces is arranged next to this loading station. A unilaterally acting manipulating device (11) removes workpieces from the stack and places them on the tray of the loading station.

A welding station (12) with a high-frequency welding unit (17) is arranged following the loading station (9). The welding unit (17) is coupled in the known manner to a high-frequency generator (13). The next a station in feeding direction is a removing station (14) from which the workpiece, or the tool with the workpiece placed in the tool, is lifted from tray (6) and is laterally moved away and is placed on a discharge belt (15) extending parallel to the feed belt (2). The empty tray (6) is moved further into the upper side of elevator unit (4) which places the tray on the return unit (3) located underneath.

The installation further includes a control cabinet (16) from which all functions of the installation are controlled.

The high-frequency welding installation according to the invention operates as follows.

A tray (6) located in the loading station (8) may already have in it some workpiece material or appropriate tools. This tray is moved into the next station, i.e., actual loading station (9), in which manipulating device (11) removes, for example, a plastic foil blank from workpiece stack (10) and places it on the tray. In the next cycle, the tray is moved into the next following welding station in which the individual workpiece parts are welded together by means of appropriate known high-frequency units (17). After the workpiece has been released from the welding unit, the tray is moved into the next following removal station (14). In station (14), the workpiece, or the workpiece with cover tool, is removed from the tray and is placed on a parallel discharge belt (15) and is conveyed from the installation to other units which are not coupled to the installation. The empty tray is moved into the elevator unit (4) which moves the tray vertically downwardly and places it on the return unit (3) located underneath. Return unit (3) transports the tray with increased speed to elevator unit (5) which again vertically raises the tray into the position (7) where it is picked up by feed unit (3) and again undergoes the cycle described above.

In a different mode of operation, the workpiece is not removed from the tray in removal station (14), but travels with the tray through elevator unit (4) and with accelerated return to elevator unit (5) and, by means of elevator unit (5), into station (7). In this initial station, the workpiece is then removed from the tray. This mode of operation has the above-described advantageous effect that welded workpieces which require a longer cooling time remain on the tray and travel the entire return path, for example, in a closed cover tool, and can sufficiently cool during this time.

I claim:

1. High-frequency welding installation for welding plastic parts including:
    at least one work station and one feed station and an initial station arranged in linear succession,
    trays on which work pieces are conducted through the stations by means of a transport system in a single direction and are returned into the initial station in the opposite direction outside of the stations in an essentially vertically offset plane, wherein the trays have working sides and and are arranged during the transport in both directions always with the working side facing upwardly
    the improvement which comprises that
    at least two work stations are arranged in linear succession,
    four essentially straight-line transport units are provided,
    the first unit is a feed unit, the third unit is a return unit, and the second and fourth unit are each a vertical elevator, wherein the return unit is arranged essentially parallel to the feed unit and at least the return unit is capable of operating at a higher transport speed than the feed unit.

2. High-frequency welding installation according to claim 1, characterized in that the return unit (3) is arranged vertically above the feed unit (2).

3. High-frequency welding installation according to claim 1, characterized in that the return unit (3) is arranged vertically underneath the feed unit (2).

4. High-frequency welding installation according to claim 1. characterized in that the feed unit (2) and the return unit (3) of the transport system are constructed so as to be expandable in the manner of modules.

* * * * *